US010935100B2

(12) United States Patent
Steiner et al.

(10) Patent No.: US 10,935,100 B2
(45) Date of Patent: Mar. 2, 2021

(54) DEVICE FOR COMPENSATING FREE INERTIA FORCES OF A RECIPROCATING PISTON INTERNAL COMBUSTION ENGINE

(71) Applicant: Ford Global Technologies, LLC, Dearborn, MI (US)

(72) Inventors: Bernd Steiner, Bergisch Gladbach (DE); Klaus P. Kuepper, Dormagen (DE); Jonathan Gregory, Colchester (GB)

(73) Assignee: Ford Global Technologies, LLC, Dearborn, MI (US)

( * ) Notice: Subject to any disclaimer, the term of this patent is extended or adjusted under 35 U.S.C. 154(b) by 515 days.

(21) Appl. No.: 15/651,863

(22) Filed: Jul. 17, 2017

(65) Prior Publication Data

US 2018/0023656 A1 Jan. 25, 2018

(30) Foreign Application Priority Data

Jul. 22, 2016 (DE) .......................... 102016213483.3

(51) Int. Cl.
*F16F 15/00* (2006.01)
*F16F 15/28* (2006.01)
(Continued)

(52) U.S. Cl.
CPC ........... *F16F 15/002* (2013.01); *B60W 10/06* (2013.01); *B60W 10/08* (2013.01); *B60W 20/00* (2013.01);
(Continued)

(58) Field of Classification Search
CPC ...... B60W 10/06; B60W 10/08; B60W 20/00; B60W 2510/0638; B60W 2510/0657; B60W 2710/06; B60W 2710/08; B60W 10/00; B60Y 2200/92; B60Y 2300/43; F02B 75/06; F02B 75/20;
(Continued)

(56) References Cited

U.S. PATENT DOCUMENTS 4,802,648 A 2/1989 Decker et al.
4,890,858 A 1/1990 Blankenship
(Continued)

FOREIGN PATENT DOCUMENTS

CN 102927199 A 2/2013
CN 103133596 A 6/2013
(Continued)

OTHER PUBLICATIONS

Gregory, J. et al., "An Engine Balance Assembly Using Electric Motors," U.S. Appl. No. 15/429,072, filed Feb. 9, 2017, 36 pages.
(Continued)

*Primary Examiner* — Krishnan Ramesh
(74) *Attorney, Agent, or Firm* — Geoffrey Brumbaugh McCoy Russell LLP (57) ABSTRACT

Systems and methods for reducing inertial forces of a reciprocating piston internal combustion engine are described. The systems and methods may provide for counterweights in a form of pistons in cylinders that are moved via electromagnets. The counterweights may be moved at a frequency that corresponds to engine speed via an alternating current.

8 Claims, 5 Drawing Sheets

(51) Int. Cl.
  *F16F 15/26* (2006.01)
  *B60W 10/06* (2006.01)
  *B60W 10/08* (2006.01)
  *B60W 20/00* (2016.01)
  *F02B 75/20* (2006.01)
  *F02B 75/06* (2006.01)
  *F02B 75/18* (2006.01)

(52) U.S. Cl.
  CPC .............. *F02B 75/20* (2013.01); *F16F 15/26* (2013.01); *F16F 15/261* (2013.01); *F16F 15/283* (2013.01); *F16F 15/286* (2013.01); *B60W 2510/0638* (2013.01); *B60W 2510/0657* (2013.01); *B60W 2710/06* (2013.01); *B60W 2710/08* (2013.01); *B60Y 2200/92* (2013.01); *B60Y 2300/43* (2013.01); *F02B 75/06* (2013.01); *F02B 2075/1812* (2013.01); *F16F 2222/08* (2013.01); *F16F 2230/0011* (2013.01); *F16F 2230/42* (2013.01); *F16F 2238/02* (2013.01); *Y10S 903/93* (2013.01)

(58) Field of Classification Search
  CPC . F02B 2075/1812; F16F 15/002; F16F 15/22; F16F 15/223; F16F 15/261; F16F 15/262; F16F 15/265; F16F 15/286; F16F 15/28; F16F 15/26; Y10S 903/93
  USPC .......................................................... 701/22
  See application file for complete search history.

(56) References Cited

U.S. PATENT DOCUMENTS

| | | | |
|---|---|---|---|
| 5,434,783 | A | 7/1995 | Pal et al. |
| 5,820,113 | A | 10/1998 | Laughlin |
| 5,950,756 | A | 9/1999 | Satoh et al. |
| 6,138,629 | A | 10/2000 | Masberg et al. |
| 6,256,545 | B1 | 7/2001 | Kimura et al. |
| 10,794,449 | B2 * | 10/2020 | Barnes .................. F16F 15/283 |
| 2005/0248070 | A1 | 11/2005 | Ichikawa et al. |
| 2009/0045560 | A1 | 2/2009 | Fueki et al. |
| 2013/0139778 | A1 | 6/2013 | Ahn |
| 2015/0061291 | A1 * | 3/2015 | Benda .................. B60L 11/123 290/45 |
| 2019/0085937 | A1 * | 3/2019 | Suezaki .................... F16C 3/08 |

FOREIGN PATENT DOCUMENTS

| | | |
|---|---|---|
| DE | 4410495 A1 | 9/1995 |
| DE | 102011100306 A1 | 11/2012 |
| JP | H05178046 A | 7/1993 |
| KR | 20060070207 A | 6/2006 |
| WO | 2005042943 A1 | 5/2005 |

OTHER PUBLICATIONS

National Intellectual Property Administration of the People's Republic of China, Office Action and Search Report Issues in Application No. 201710593874.6, dated May 28, 2020, 19 pages. (Submitted with Partial Translation).

* cited by examiner

DEVICE FOR COMPENSATING FREE INERTIA FORCES OF A RECIPROCATING PISTON INTERNAL COMBUSTION ENGINE

CROSS REFERENCE TO RELATED APPLICATION

The present application claims priority to German Patent Application No. 102016213483.3, filed Jul. 22, 2016. The entire contents of the above-referenced application are hereby incorporated by reference in its entirety for all purposes.

FIELD

The present description relates to methods and a system for operating an engine. The methods and systems may be particularly useful for small displacement engines with cylinder configurations that may result in engine vibration.

BACKGROUND AND SUMMARY

A reciprocating piston internal combustion engine is an engine that converts the change in volume of a combustion gas into a rotary motion by means of a linearly moving piston via a connecting rod and a crankshaft. The expansion of the combustion gas in a cylinder performs work on the piston, which is transferred to the crankshaft by a connecting rod. Thus, the oscillating motion of the piston is converted into a rotary motion. Reciprocating piston internal combustion engines operate as a rule according to the two-stroke or four-stroke method.

As a result of the reciprocating motion of the piston and connecting rod and as a result of the non-uniform transmission characteristic of the crank drive, inertial forces occur that are absorbed in engine bearings and stimulate adjacent structures to vibrate.

The inertial forces of the linearly moving parts of the crank drive (oscillating masses) can be described by a series expansion, wherein the first element of the series expansion describes 1st order free inertial forces and the second element of the series expansion describes 2nd order free inertial forces.

In order to compensate 2nd order free inertial forces, at least six cylinders are required in the case of in-line engine or eight cylinders in the case of a V-engine, or balancing shafts are required on which suitable balance weights circulate at twice the crankshaft revolution rate. In the case of in-line engines with fewer than six cylinders and V-engines with fewer than eight cylinders, balancing shafts are often used. Another possibility for achieving full mass compensation consists of the use of two contrarotating crankshafts, such as for example in the case of the H-engine. As a result, even 2-cylinder engines can be fully balanced.

In order to achieve a reduction in consumption, during so-called downsizing for example the number of cylinders is reduced from 4 to 3, because in this way the internal area and thereby the frictional area of the piston as well as the external heat loss from the combustion chambers can be reduced. Such 3-cylinder engines are implemented as in-line engines with cylinders arranged one after the other in series. Furthermore, they are relatively compact and can be manufactured at a more favorable cost than a four-cylinder engine. They are used as the drive for motor cycles and automobiles, the latter in particular for subcompact cars and recently also in the compact class.

Three-cylinder in-line engines naturally have somewhat poorer quiet running than four-cylinder in-line engines (although better than two-cylinder in-line engines), because the firing interval is greater and free inertial moments occur. Both first order and also second order free inertial moments occur. With a balancing shaft, the first order free inertial moment can be compensated; the second order free inertial moment is not compensated because of the high cost.

Furthermore, it is known from JP H 05178046 A to use an electromagnetically driven counterweight for active vibration damping.

It is therefore the object of the invention to show ways in which free inertial forces can be compensated at lower cost.

The object of the invention is achieved by a device for compensating free inertial forces of a reciprocating piston internal combustion engine with at least two pistons, comprising at least two counterweights, each of which can be displaced between two end positions, and with each of which an electromagnet for displacing the corresponding counterweight is associated, wherein the counterweights are associated with the respective pistons adjacent thereto in the axial direction of a crankshaft of the reciprocating piston internal combustion engine and a control unit is provided that displaces the counterweight by means of the associated electromagnet in antiphase to the respectively associated piston. Moreover, a revolution rate detector detects a revolution rate of the reciprocating piston internal combustion engine, a comparator compares the detected revolution rate with a threshold value and the control unit provides the at least two electromagnets with electric current if the detected revolution rate is less than the threshold value.

In other words, the reciprocating piston internal combustion engine comprises at least two cylinders that run in antiphase, i.e. when the first cylinder is at top dead center, the second cylinder is at bottom dead center. In the axial extension direction of the crankshaft of the reciprocating piston internal combustion engine, next to the first and the second cylinders, i.e. adjacent to the respective cylinders, a counterweight is disposed in each case that can be displaced between the two end positions thereof by a respective electromagnet. During this, the electromagnets are controlled such that each respective counterweight is in antiphase to the immediately adjacent piston; i.e., the right counterweight is in antiphase to the right piston of the two pistons, whereas the left counterweight is in antiphase to the left piston of the two pistons. Thus, 1st order free inertial forces can be compensated in a simple manner. The electromagnets are only then supplied with electric current and thereby the device is actively operated if the reciprocating piston internal combustion engine is being operated with a low revolution rate at which the vibrations are perceived by passengers of a motor vehicle as particularly unpleasant. On the other hand, the device is inactive at higher revolution rates which produce vibrations of higher frequency, which is not perceived as being unpleasant. Thus, the device is only activated when required, which reduces the fuel consumption and extends the service life of the device.

According to one embodiment, the counterweights are implemented as pistons mounted in cylinders. In this case, the height of the cylinder defines the two end positions between which the counterweight can be displaced. Thus, the device can comprise a design that is simple to manufacture.

According to a further embodiment, the counterweights are each held in a null position by a spring. This ensures that the counterweights adopt a defined null position if the respective electromagnets are not being supplied with an electric current.

According to a further embodiment, the reciprocating piston internal combustion engine comprises at least one central piston disposed in the axial direction of the crankshaft. In other words, the reciprocating piston engine is implemented as a 3-cylinder engine. Indeed, in the case of such a 3-cylinder engine, in particular a 3-cylinder in-line engine, in any arbitrary crankshaft position the center of gravity always lies centrally in the middle, so that there are no vibrations. Because the cylinders are disposed one after the other in series, for example the right cylinder produces a force upwards (towards top dead center), whereas the left cylinder produces an opposite force, and this is downwards (towards bottom dead center). Because said forces are now applied to different ends of the 3-cylinder engine, it does not vibrate as a whole but only at the ends, because the central cylinder is disposed at the center of gravity, and thereby virtually constitutes the point of rotation. Thus, with the arrangement of the counterweights on both sides, said specific vibrations can be actively damped particularly effectively. Further cylinders can be provided beyond this, so that the reciprocating piston internal combustion engine can also be implemented as a 5-cylinder in-line engine, for example.

According to a further embodiment, the two counterweights each have the same mass. This results in particularly effective damping of vibrations if the center of gravity of the entire assembly lies in the middle, i.e. the reciprocating piston internal combustion engine and the attached components have a center of gravity that lies in the middle.

According to a further embodiment, the two counterweights have different masses. This enables particularly effective damping of vibrations if the center of gravity of the entire assembly does not lie in the middle.

Furthermore, the invention includes a reciprocating piston internal combustion engine with such a device and a motor vehicle with such a reciprocating piston internal combustion engine. In the reciprocating piston internal combustion engine, the device for compensating free inertial forces can in particular be integrated within the engine housing in the immediate vicinity of the penetration points of the crankshaft through the engine housing, for example immediately above the penetration points. This enables an installation space-optimized implementation of the reciprocating piston internal combustion engine with a device for compensating free inertial forces.

The present description may provide several advantages. Specifically, the system may reduce engine starting emissions. In addition, the system may reduce the possibility of degrading heat sensitive engine components. Further, the system may be operated according to vehicle conditions to improve system operation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1A:
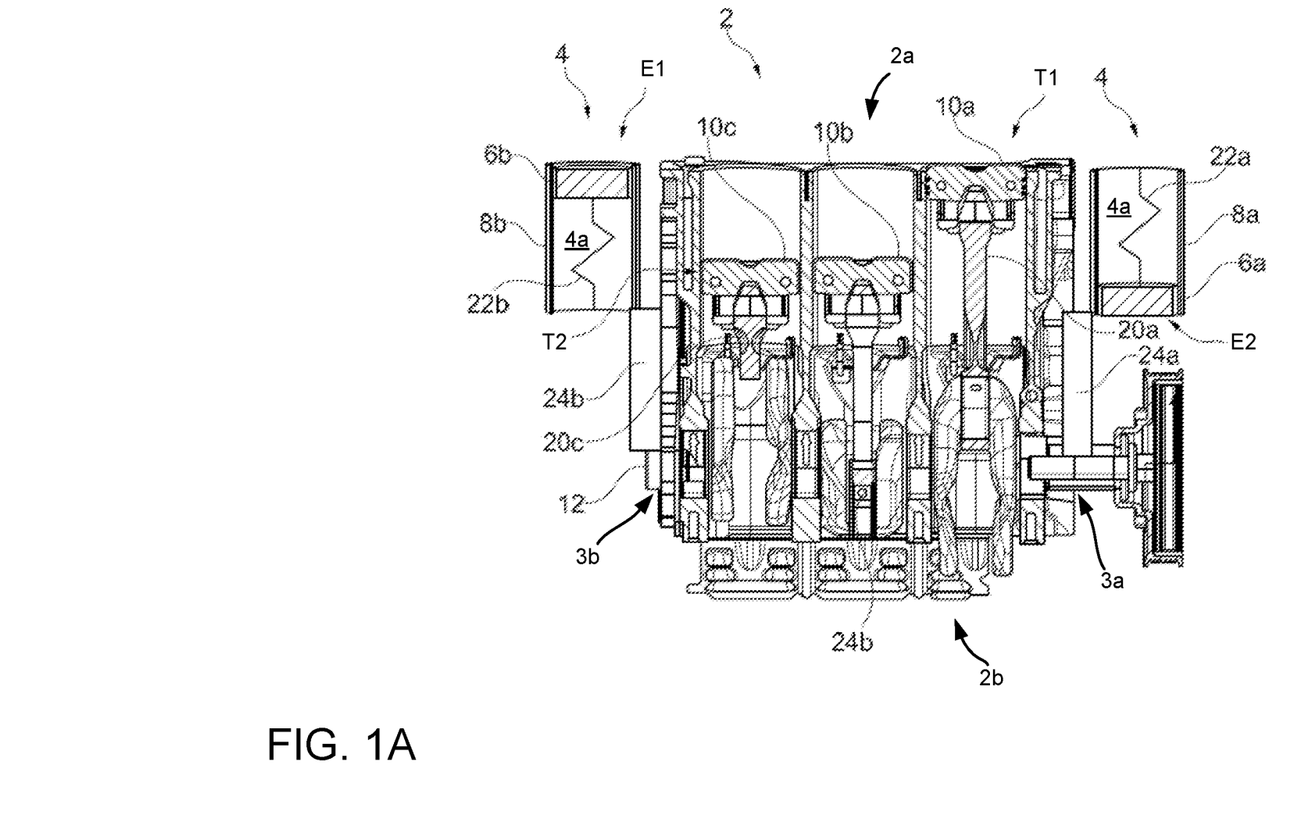
FIG. 1A shows a schematic diagram of an engine and electrically actuated counterweights.
Figure 1B:
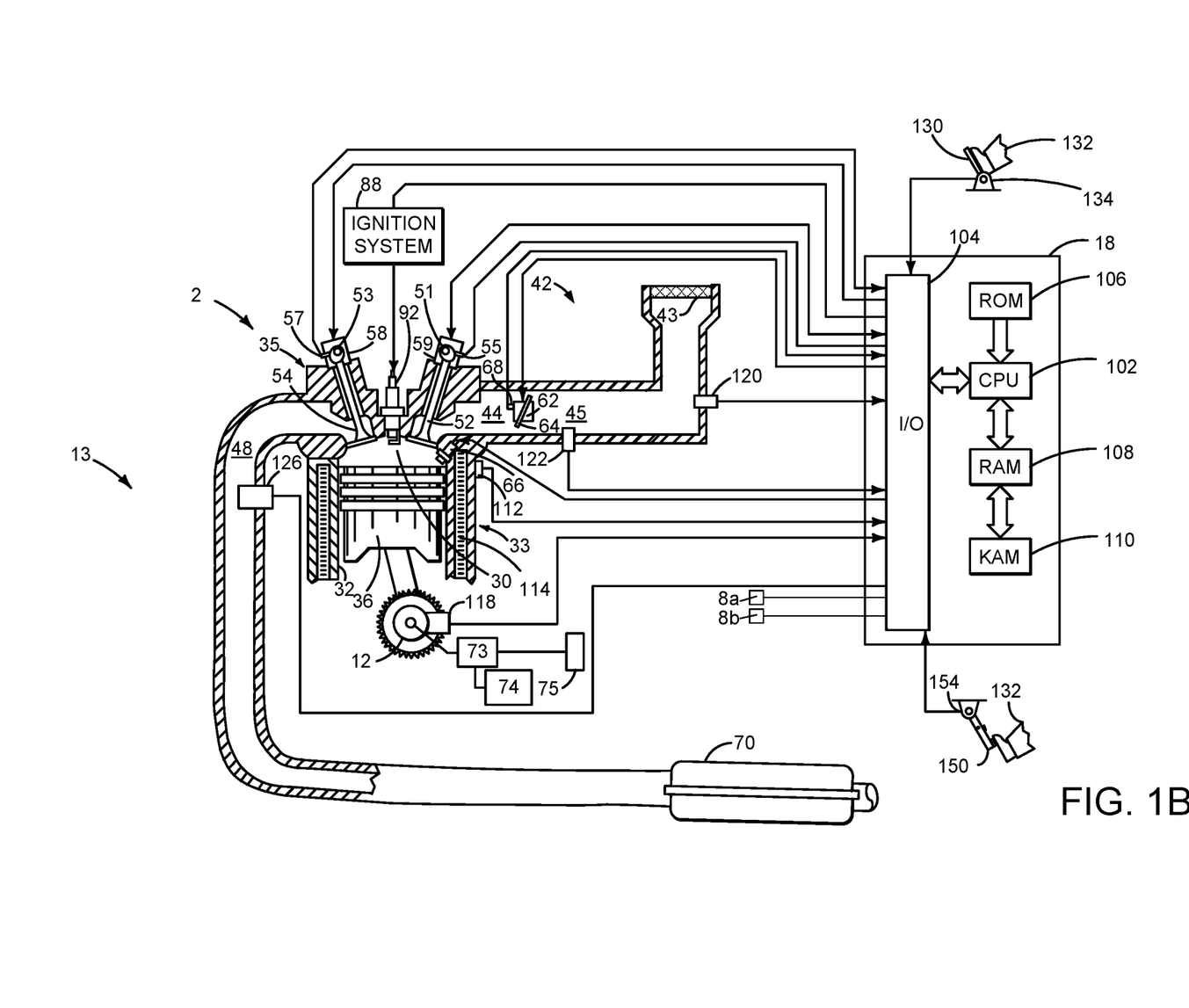
FIG. 1B shows a schematic diagram of an engine system that includes the engine of FIG. 1A.
Figure 2:
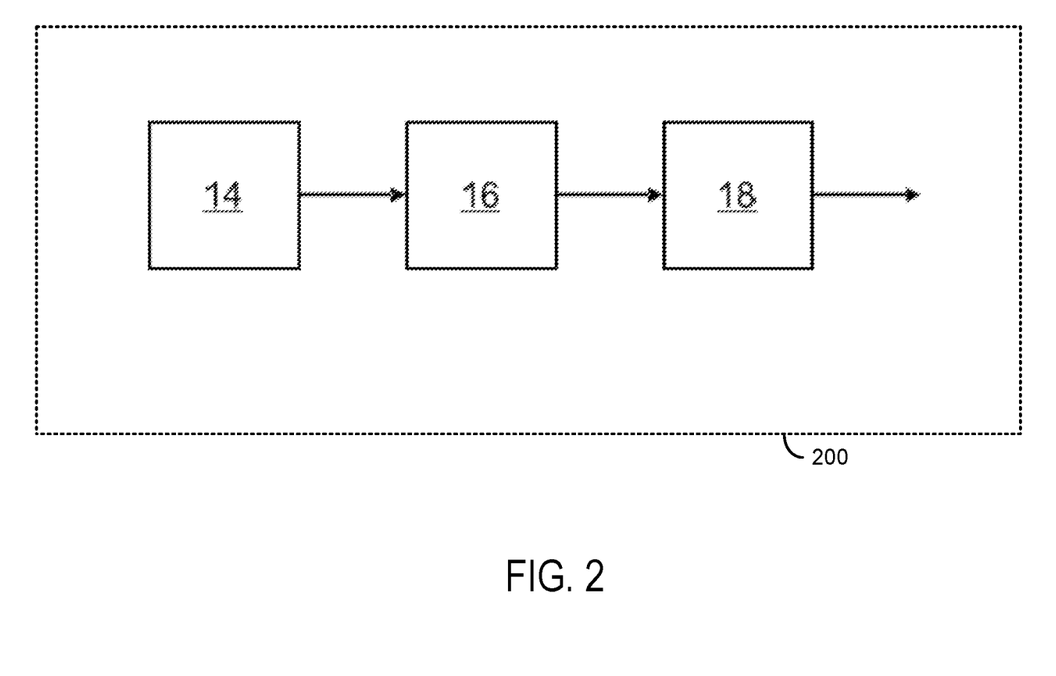
FIG. 2 is a schematic of additional devices included in the system of FIGS. 1A and 1B.
Figure 3:
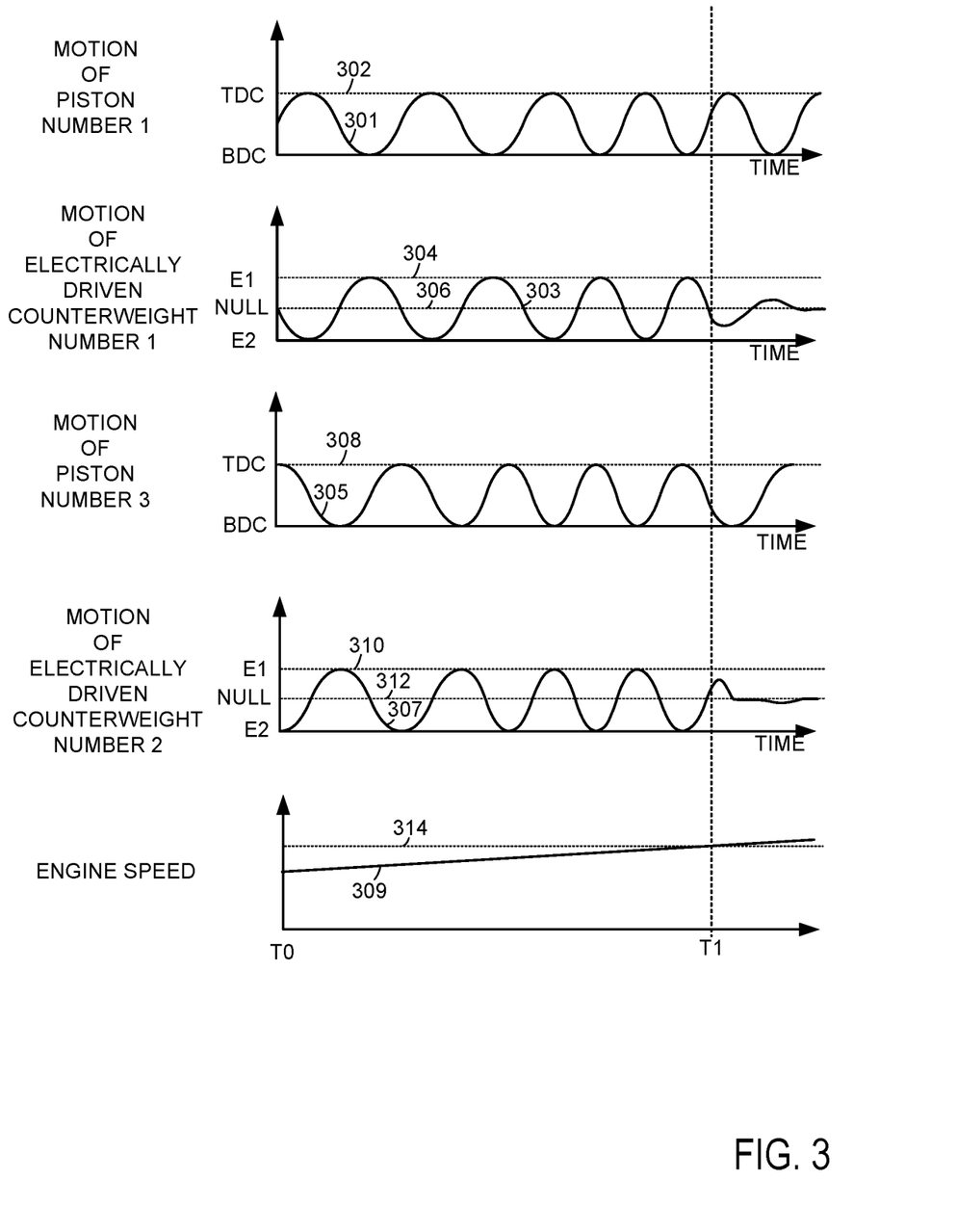
FIG. 3 shows an example engine operating sequence according to the method of FIG. 4.

The present description is related to improving operation of an engine. The engine may be configured as shown in FIGS. 1A and 1B. The engine may be included in a system as shown in FIGS. 1A-2. The engine and engine system may operate as is shown in FIG. 3. The system may be operated via a controller according to the method of FIG. 4.

FIG. 1A represents a reciprocating piston internal combustion engine 2 that in the present exemplary embodiment is implemented as a 3-cylinder in-line engine. In this case, the reciprocating piston internal combustion engine 2 can be implemented as an Otto engine or a diesel engine and is used as a drive for a motor vehicle, for example of an automobile, such as a subcompact vehicle or a compact vehicle. Engine 2 is oriented with top 2a up and bottom 2b down.

Accordingly, in the present exemplary embodiment the reciprocating piston internal combustion engine 2 comprises three pistons 10a, 10b, 10c, which are disposed in series along the extension direction of a crankshaft 12 of the reciprocating piston internal combustion engine 2, to which the pistons 10a, 10b, 10c are connected by means of respective connecting rods 20a, 20b, 20c. In this case, the three pistons 10a, 10b, 10c can each be displaced between a top dead center position T1 and a bottom top dead center position T2 in respective cylinders of the reciprocating piston internal combustion engine 2.

As can be seen using FIG. 1A, the right piston 10a is disposed in the top dead center position T1, whereas the left piston 10c is disposed in the bottom dead center position T2. In other words, the right piston 10a and the left piston 10c are oppositely connected to the crankshaft 12 by means of the respective connecting rods 20a, 20c thereof.

However, because the pistons 10a, 10b, 10c are disposed one after the other in series, during operation of the reciprocating piston internal combustion engine 2 the right piston 10a produces a force towards the top dead center position T1, whereas the left piston 10c produces an opposite force towards the bottom dead center position T2.

Said free inertial forces engage different ends of the 3-cylinder engine, so that the reciprocating piston internal combustion engine 2 vibrates relative to the crankshaft 12, in particular at the axial ends thereof, whereas the center piston 10b is disposed at the center of gravity and thereby approximately constitutes the point of rotation.

In order to compensate or to attenuate said free inertial forces, the device 4 is provided, which in the present exemplary embodiment comprises two counterweights 6a, 6b, each of which can be displaced between an upper end position E1 and a lower end position E2. In the present exemplary embodiment, the counterweights 6a, 6b are formed by pistons that are mounted in cylinders 4a.

For displacing the counterweights 6a, 6b, electromagnets 8a, 8b are associated with each counterweight 6a, 6b, that displace the counterweights 6a, 6b, by magnetic force if the respective electromagnets 8a, 8b are supplied with electric current. In the present exemplary embodiment, the electromagnets 8a, 8b are formed by coils that encircle the pistons in which the counterweights 6a, 6b, are supported. Furthermore, in the present exemplary embodiment the counterweights 6a, 6b, are held in the null position thereof by an upper spring 22a and a lower spring 22b, in the present exemplary embodiment the null position being in the center between the two end positions E1, E2.

In the present exemplary embodiment, the reciprocating piston internal combustion engine 2 comprises a symmetrical design, so that the center of gravity thereof lies at the center. Therefore, the two counterweights 6a, 6b, each have the same mass. Alternatively, the two weights 6a, 6b can also have different masses if the center of gravity is not at the center.

As can further be seen using FIG. 1A, the right weight 6a, which is disposed immediately adjacent to the right piston 10a in the extension direction of the crankshaft 12, is in the lower end position E2 thereof. At the same time, the left weight 6b, which is disposed immediately adjacent to the left piston 10c in the extension direction of the crankshaft 12, is in the upper end position E1 thereof.

Thus, on the one hand the two weights 6a, 6b are opposite each other. On the other hand, the right weight 6a is opposed to the right piston 10a and the left weight 6b is opposed to the left piston 10c. Furthermore, the right piston 10a and the left piston 10c are mutually opposed.

Referring to FIG. 1B, internal combustion engine 2, comprising a plurality of cylinders, one cylinder of which is shown in FIG. 1B, is controlled by electronic engine controller 12. Engine 2 is comprised of cylinder head 35 and block 33, which include combustion chamber 30 and cylinder walls 32. Piston 36 is positioned therein and reciprocates via a connection to crankshaft 12. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices. Exhaust flows from cylinder head 35 to after treatment device 70 via exhaust system 13, which may include exhaust manifold 48, after treatment device 70, and associated piping.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with engine air intake 42. Optional electronic throttle 62 adjusts a position of throttle plate 64 to control air flow to intake manifold 44. In some examples, throttle 62 and throttle plate 64 may be positioned between intake valve 52 and intake manifold 44 such that throttle 62 is a port throttle. Air filter 43 cleans air entering engine air intake 42.

Distributorless ignition system 88 provides an ignition spark to combustion chamber 30 via spark plug 92 in response to controller 18. Universal Exhaust Gas Oxygen (UEGO) sensor 126 is shown coupled to exhaust manifold 48 upstream of catalytic converter or after treatment device 70. Alternatively, a two-state exhaust gas oxygen sensor may be substituted for UEGO sensor 126.

As previously mentioned after treatment device or converter 70 can include multiple catalyst bricks, in one example. In another example, multiple emission control devices, each with multiple bricks, can be used. Converter 70 can be a three-way type catalyst in one example, particulate filter, selective catalytic converter, or oxidation catalyst.

Controller 18 is shown in FIG. 1B as a conventional microcomputer including: microprocessor unit 102, input/output ports 104, read-only memory 106 (e.g., non-transitory memory), random access memory 108, keep alive memory 110, and a conventional data bus. Controller 18 is shown receiving various signals from sensors coupled to engine 2, in addition to those signals previously discussed, including: engine coolant temperature (ECT) from temperature sensor 112 coupled to cooling sleeve 114; a position sensor 134 coupled to an accelerator pedal 130 for sensing force applied by human 132; a position sensor 154 coupled to brake pedal 150 for sensing force applied by human 132, a measurement of engine manifold pressure (MAP) from pressure sensor 122 coupled to intake manifold 44; an engine position sensor from a Hall effect sensor 118 sensing crankshaft 12 position; a measurement of air mass entering the engine from sensor 120; and a measurement of throttle position from sensor 68. Barometric pressure may also be sensed (sensor not shown) for processing by controller 18. In a preferred aspect of the present description, engine position sensor 118 produces a predetermined number of equally spaced pulses every revolution of the crankshaft from which engine speed (RPM) can be determined.

During operation, each cylinder within engine 2 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 10a moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft.

Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples. In other examples, engine 2 may be a compression ignition or diesel engine.

Engine 2 is also shown coupled to transmission 73. Transmission 73 may be a fixed ratio transmission, a fixed gear set, or a variable transmission. Electric machine 74 is also shown coupled to transmission 73 such that power from engine 2 and electric machine 74 may be combined and delivered to vehicle wheels 75. Engine 2 and electric machine 74 may be included in parallel and/or serial hybrid vehicles. In this way, output of engine 2 may be combined with output of electric machine 74. Additionally, electric machine may operate in a generator mode from time to time where it converts mechanical energy from engine 2 or from vehicle wheels 75 into electrical energy that may be stored in a battery or other electric energy storage device.

Referring now to FIG. 2, further components of the engine 2 represented in FIGS. 1A-1B are shown in vehicle 200. The further components may include a revolution rate detector 14, a comparator 16, and the controller 18.

The revolution rate detector 14 is implemented to detect a revolution rate of the crankshaft 12 of the reciprocating piston internal combustion engine 2. The comparator 16 is implemented to compare the detected revolution rate with a threshold value. The controller 18 is implemented to provide the two electromagnets 8a, 8b with electric current if the detected revolution rate is less than the threshold value.

During operation, the revolution rate detector 14 detects the revolution rate of the crankshaft 12 of the reciprocating piston internal combustion engine 2. If the detected revolution rate is less than the threshold value, the controller 18 may provide the two electromagnets 8a, 8b to electric current, which has the effect that the right counterweight 6a moves reciprocally in antiphase to the right piston 10a between the two end positions E1, E2, whereas the left counterweight 6b moves reciprocally in antiphase to the left piston 10c between the two end positions E1, E2 and 1st order free inertial forces are compensated.

If the detected revolution rate reaches a value that is greater than the threshold value, the two electromagnets 8a, 8b are no longer supplied with electric current, so that the two counterweights 6a, 6b return to the null position thereof owing to the effect of the springs 22a, 22b and remain there. Thus, the device 4 may be inactive at higher revolution rates that produce vibrations of higher frequency that are not perceived as being unpleasant. Thus, the device 4 may only activated when desired, which may extend the service life thereof.

In a special configuration of the reciprocating piston internal combustion engine 2 represented in FIG. 1A, the counterweights 6a, 6b, the electromagnets 8a, 8b and the springs 22a, 22b may be thus integrated within the engine housing in the region of the surfaces 24a, 24b shown in FIG. 1A immediately above the penetration points 3a, 3b of the crankshaft 12 through the engine housing. This enables installation space-optimized integration of the device 4 for compensating free inertial forces in the reciprocating piston internal combustion engine 2.

The system of FIGS. 1A-2 provides for a vehicle system, comprising: an engine including two or more pistons; first and second electrically driven counterweights coupled to the engine, the first and second electrically driven counterweights including electromagnets; and a controller including executable instructions stored in non-transitory memory to move the first and second electrically driven counterweights at a speed that is a function of engine speed via the electromagnets. The vehicle system further comprises additional instructions to deactivate the electromagnets responsive to engine speed. The vehicle system further comprises a propulsion electric machine for providing torque to a vehicle driveline. The vehicle system further comprises additional instructions to deactivate the first and second electrically driven counterweights when the propulsion electric machine is activated. The vehicle system further comprises additional instructions to reduce vibrations of the engine via the propulsion electric machine. The vehicle system further comprises additional instructions to adjust amplitude of current supplied to the electromagnets responsive to engine load.

Referring now to FIG. 3, an example operating sequence is shown. The sequence of FIG. 3 may be provided by the system of FIGS. 1A-2 according to the method of FIG. 4. The plots shown in FIG. 3 are aligned in time. Vertical markers T0-T1 represent times of particular interest in the sequence.

The first plot from the top of FIG. 3 is a plot of cylinder number one piston position versus time. The vertical axis represents cylinder number one piston position. Cylinder number one piston (e.g., 10a of FIG. 1A) is at top dead center (T1 of FIG. 1A) when trace 301 is at the level of horizontal line 302. Cylinder number one piston is at bottom dead center when trace 301 is at the level of the horizontal axis. The horizontal axis represents time and time increases from the left side of the plot to the right side of the plot. Horizontal line 302 represents top dead center piston position.

The second plot from the top of FIG. 3 is a plot of motion of first electrically driven counterweight (e.g., 6a of FIG. 1A) versus time. The vertical axis represents position of the first electrically driven counterweight. First counterweight is at top dead center (E1 of FIG. 1A) when trace 303 is at the level of horizontal line 304. First counterweight is at bottom dead center (E2 of FIG. 1A) when trace 303 is at the level of the horizontal axis. The horizontal axis represents time and time increases from the left side of the plot to the right side of the plot. Horizontal line 304 represents top dead center counterweight position. Horizontal line 306 represents a null position for counterweight 6a.

The third plot from the top of FIG. 3 is a plot of cylinder number three piston position versus time. The vertical axis represents cylinder number three piston position. Cylinder number three piston (e.g., 10c of FIG. 1A) is at top dead center (T1 of FIG. 1A) when trace 305 is at the level of horizontal line 308. Cylinder number three piston is at bottom dead center when trace 305 is at the level of the horizontal axis. The horizontal axis represents time and time increases from the left side of the plot to the right side of the plot. Horizontal line 308 represents top dead center piston position.

The fourth plot from the top of FIG. 3 is a plot of motion of second electrically driven counterweight (e.g., 6b of FIG. 1A) versus time. The vertical axis represents position of the second electrically driven counterweight. Second counterweight is at top dead center (E1 of FIG. 1A) when trace 307 is at the level of horizontal line 310. Second counterweight is at bottom dead center (E2 of FIG. 1A) when trace 307 is at the level of the horizontal axis. The horizontal axis represents time and time increases from the left side of the plot to the right side of the plot. Horizontal line 310 represents top dead center counterweight position. Horizontal line 312 represents a null position for counterweight 6b.

The fifth plot from the top of FIG. 3 is a plot of engine speed versus time. The vertical axis represents engine speed and engine speed increases in the direction of the vertical axis arrow. The horizontal axis represents time and time increases from the left side of the plot to the right side of the plot. Horizontal line 314 represents a threshold engine speed above which the electrically driven counterweights are deactivated. Threshold 314 may be an empirically determined engine speed above which vehicle occupants are not disturbed by engine vibration. Thus, if vehicle occupants are not disturbed by frequencies above 15 Hz, counterweight motion is stopped when engine speed is above a speed where engine firing or combustion frequency exceeds 15 Hz. The counterweights are in motion for engine speeds below a speed where engine firing combustion frequency is less than 15 Hz.

At time T0, the engine speed is slowly increasing and piston number one is traveling toward top dead center. The motion of counterweight number one is antiphase or 180 crankshaft degrees out of phase with the position of piston number one to counter inertial forces from piston number one. Similarly, motion of counterweight number two is antiphase or 180 crankshaft degrees out of phase with the position of piston number three to counter inertial forces from piston number three. Piston number one is beginning to move away from top dead center.

Between time T0 and time T1, the engine speed continues to increase and the time for piston number one and piston number three to travel 720 crankshaft degrees decreases. The electrically driven counterweights accelerate as the pistons accelerate.

At time T1, the engine speed exceeds threshold 314 so the electrically driven counterweights are deactivated. Instead of simply cutting current flow to the electromagnets, the amplitude of the AC waveform is reduced, thereby reducing the amplitude of the electrically driven counterweights. The amplitude of the AC waveform is reduced, but the frequency of the AC waveform follows and is equal to the frequency of piston motion. By reducing the amplitude of the AC current supplied to the electromagnets, the amplitude of the counterweights is reduced until the counterweights assume their respective null positions.

In this way, the electrically driven counterweights may be selectively operated based on engine speed. By deactivating the electrically driven counterweights, electrical energy may be conserved.

Figure 4:
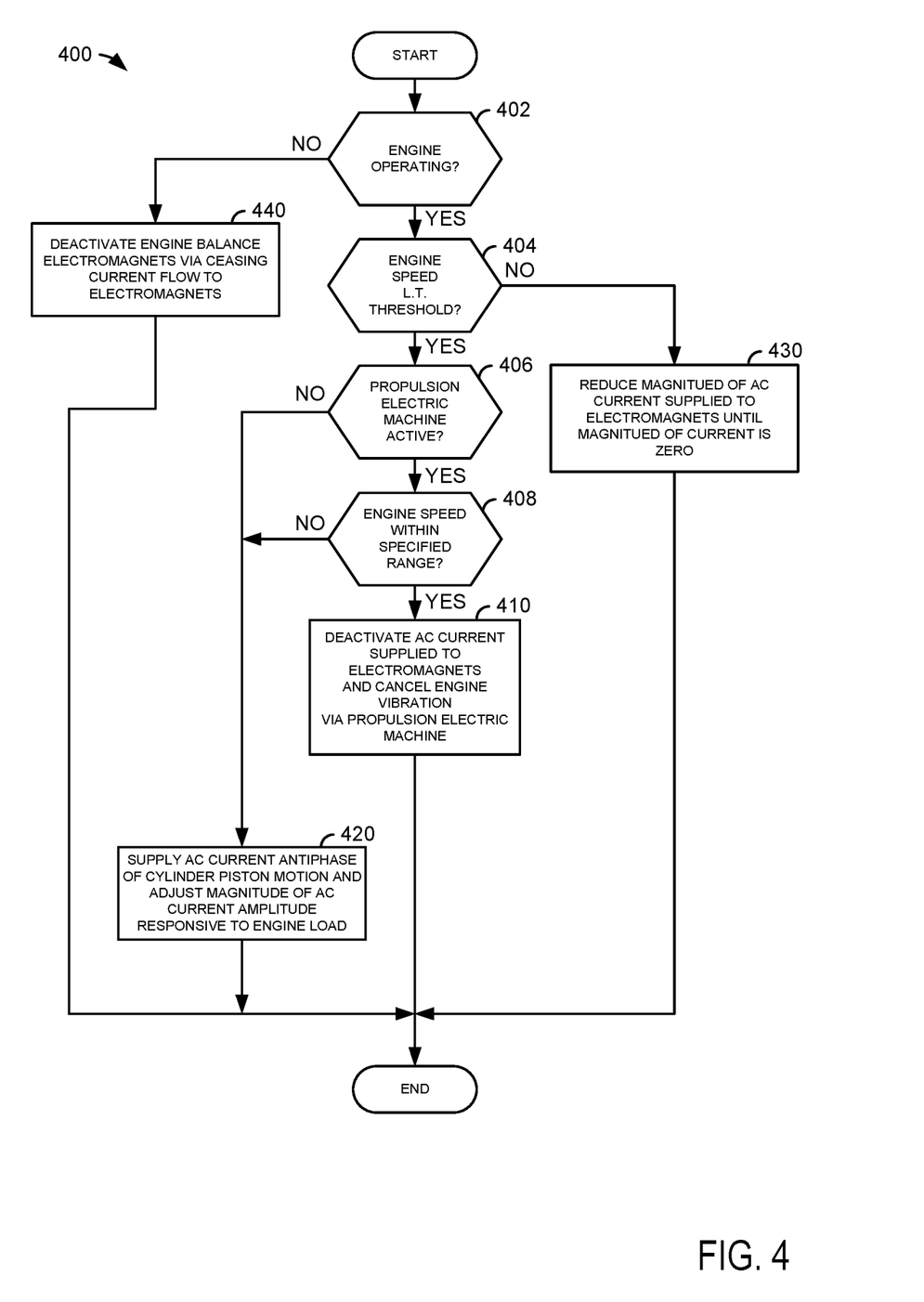
FIG. 4 shows an example method for operating the system of FIGS. 1A-2.

Referring now to FIG. 4, a method for operating electrically driven counterweights (e.g., 6a and 6b of FIG. 1A) is shown. At least portions of method 400 may be implemented as executable controller instructions stored in non-transitory memory of controller 18. Additionally, portions of method 400 may be actions taken in the physical world to transform an operating state of an actuator or device.

At 402, method 400 judges if the engine is operating and combusting air and fuel. In one example, method 400 may judge that the engine is operating and combusting air and fuel if engine speed is greater than a threshold speed (e.g., engine cranking speed). If so, the answer is yes and method 400 proceeds to 404. Otherwise, the answer is no and method 400 proceeds to 440.

At 440, method 400 ceases current flow to electromagnets (e.g., 8a and 8b) that control motion of counterweights (6a and 6b). Ceasing current flow to the electromagnets reduces electrical power consumption. Method 400 proceeds to exit.

At 404, method 400 judges if engine speed is less than a threshold speed. In one example, the threshold speed may be a speed above which human vehicle occupants are not disturbed by engine vibration caused by combustion in engine cylinders and engine crankshaft rotation. For example, if vehicle occupants are not disturbed by frequencies above 15 Hz, counterweight motion is stopped when engine speed is above a speed where engine firing or combustion frequency exceeds 15 Hz. The counterweights are in motion for engine speeds below a speed where engine firing combustion frequency is less than 15 Hz. If method 400 judges that engine speed is less than (L.T.) the threshold, the answer is yes and method 400 proceeds to 406. Otherwise, the answer is no and method 400 proceeds to 430.

At 430, method 400 reduces the magnitude of alternating current (AC) supplied to electromagnets 8a and 8b. The magnitude of current is reduced at a predetermined rate (e.g., 0.5 amperes per second) until the magnitude of the current is zero. The predetermined rate may be empirically determined and selected in response to a rate at which vehicle occupants do not detect deactivation of the electromagnetically operated counterweights. The electromagnetically operated counterweights settle to their null position after current supplied to the electromagnets ceases. Method 400 proceeds to exit.

At 406, method 400 judges if the propulsion electric machine is active (e.g., 74 of FIG. 1B). In one example, method 400 may judge that the propulsion electric machine is active when a bit or byte in memory indicates that the propulsion electric machine is active. The propulsion electric machine may be active when an inverter that supplies electrical power to or receives electrical power from the propulsion electric machine is active. If method 400 judges that the propulsion electric machine is active, the answer is yes and method 400 proceeds to 408. Otherwise, the answer is no and method 400 proceeds to 420.

At 408, method 400 judges if engine speed is within a specified range. In one example, the predetermined range may be a low speed range of less than 500 RPM (e.g., during engine run-up conditions). If method 400 judges that engine speed is within a predetermined range, the answer is yes and method 400 proceeds to 410. Otherwise, the answer is no and method 400 proceeds to 420.

At 410, method 400 reduces a magnitude of current supplied to electromagnets 8a and 8b at a predetermined rate (e.g., 0.5 amperes per second) until the current magnitude is zero. The predetermined rate may be empirically determined and selected in response to a rate at which vehicle occupants do not detect deactivation of the electromagnetically operated counterweights. Further, method 400 reduces engine vibration via the propulsion electric machine. In one example, the propulsion electric machine is operated in a generator mode and it cancels inertial vibration via adjusting a negative torque applied to the engine as a function of engine position. In another example, the propulsion electric machine is operated in a motor mode and it cancels inertial vibration via adjusting a positive torque applied to the driveline. By canceling inertial vibrations via the propulsion electric machine, it may be possible to generate electrical power via the propulsion electric machine. Method 400 proceeds to exit.

At 420, method 400 supplies AC current to the electromagnets and so that electrically driven counterweights move antiphase or 180 crankshaft degrees out of phase of engine piston movement. Further, in some examples, method 400 may adjust a magnitude of the AC current supplied to the electromagnets responsive to engine load. For example, as engine load increases the magnitude of AC current may be increased so that the counterweights travel closer to top dead center and bottom dead center. By adjusting the magnitude of AC current, electric power may be conserved while still providing vibration compensation. The AC current may be provided at a frequency that is equivalent to engine combustion frequency (e.g., the frequency at which combustion occurs in the engine). Method 400 supplies AC current to both electromagnets 8a and 8b. Method 400 proceeds to exit.

In this way, engine vibration and noise may be reduced. Further, electrical power consumption may be reduced while cancelling engine noise and vibration via electrically driven counterweights.

Thus, the method of FIG. 4 provides for a method for operating an engine, comprising: supplying current to reciprocate counterweights in cylinders via electromagnets via a controller; and adjusting the current responsive to engine load via the controller. The method further comprises ceasing current flow to the electromagnets in response to engine speed greater than a threshold speed. The method further comprises reducing amplitude of the current supplied to the electromagnets at a predetermined rate. The method further comprises supplying current to the electromagnets at a frequency that is based on engine speed while reducing amplitude of the current supplied to the electromagnets.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, hybrid electric vehicles including engines operating in natural gas, gasoline, diesel, or alternative fuel configurations could use the present description to advantage.

The invention claimed is:

1. A vehicle system, comprising:
   an engine including two or more pistons;
   first and second electrically driven counterweights coupled to the engine, the first and second electrically driven counterweights including electromagnets;
   a propulsion electric machine for providing torque to a vehicle driveline; and
   a controller including executable instructions stored in non-transitory memory to move the first and second electrically driven counterweights at a speed that is a function of engine speed via the electromagnets; and
   deactivate the first and second electrically driven counterweights when the propulsion electric machine is activated.

2. The vehicle system of claim 1, further comprising additional instructions to deactivate the electromagnets responsive to engine speed.

3. The vehicle system of claim 1, further comprising additional instructions to reduce vibrations of the engine via the propulsion electric machine.

4. The vehicle system of claim 1, further comprising additional instructions to adjust an amplitude of current supplied to the electromagnets responsive to engine load.

5. A method for operating an engine, comprising:
   supplying a current to reciprocate counterweights in a plurality of cylinders different than combustion chambers of the engine via electromagnets via a controller; and
   adjusting the current responsive to engine load via the controller.

6. The method of claim 5, further comprising ceasing the current to the electromagnets in response to engine speed greater than a threshold speed.

7. The method of claim 5, further comprising reducing an amplitude of the current supplied to the electromagnets at a predetermined rate.

8. The method of claim 7, further comprising supplying the current to the electromagnets at a frequency that is based on engine speed while reducing the amplitude of the current supplied to the electromagnets.

* * * * *